United States Patent
Bohn

(10) Patent No.: US 8,914,191 B2
(45) Date of Patent: Dec. 16, 2014

(54) METHOD AND CONTROL CIRCUIT FOR CONTROLLING A BRAKING SYSTEM FOR MOTOR VEHICLES

(75) Inventor: Jurgen Bohn, Oberneisen (DE)

(73) Assignee: Continental Teves AG & Co. OHG, Frankfurt (DE)

(*) Notice: Subject to any disclaimer, the term of this patent is extended or adjusted under 35 U.S.C. 154(b) by 112 days.

(21) Appl. No.: 13/703,175

(22) PCT Filed: Jun. 7, 2011

(86) PCT No.: PCT/EP2011/059320
§ 371 (c)(1),
(2), (4) Date: Dec. 10, 2012

(87) PCT Pub. No.: WO2011/154369
PCT Pub. Date: Dec. 15, 2011

(65) Prior Publication Data
US 2013/0080017 A1 Mar. 28, 2013

(30) Foreign Application Priority Data

Jun. 10, 2010 (DE) .......................... 10 2010 029 897
Jun. 10, 2010 (DE) .......................... 10 2010 029 898
Jun. 10, 2010 (DE) .......................... 10 2010 029 900
Jun. 6, 2011 (DE) .......................... 10 2011 076 952

(51) Int. Cl.
*B60T 8/17* (2006.01)
*B60T 8/34* (2006.01)
*B60T 8/171* (2006.01)
*B60T 13/68* (2006.01)
(Continued)

(52) U.S. Cl.
CPC . *B60T 8/171* (2013.01); *B60T 8/34* (2013.01); *B60T 13/686* (2013.01); *B60T 8/4077*(2013.01); *B60T 2270/82* (2013.01); *B60T 13/745* (2013.01);
(Continued)

(58) Field of Classification Search
USPC ......... 701/36, 70, 71, 78, 84; 303/121, 113.1, 303/113.2, 113.4, 115.2, 115.4
See application file for complete search history.

(56) References Cited

U.S. PATENT DOCUMENTS 5,722,744 A * 3/1998 Kupfer et al. ................. 303/189
5,749,633 A * 5/1998 Baumgartner ............. 303/113.1
(Continued)

FOREIGN PATENT DOCUMENTS

DE 195 02 925 A1 1/1996
DE 195 38 794 A1 4/1997
(Continued)

OTHER PUBLICATIONS

PCT International Search Report—Sep. 14, 2011.

Primary Examiner — Thomas Tarcza
Assistant Examiner — Edward Pipala
(74) Attorney, Agent, or Firm — Brinks Gilson & Lione

(57) ABSTRACT

A method for controlling a motor vehicle electrohydraulic braking system. The method being activatable in a "brake-by-wire" operating mode, having a pressure supply device (2), which can be activated by an electronic control and a regulation unit, can be connected to a hydraulically actuatable wheel brake. Wherein the pressure supply device (2) is formed by a cylinder-piston assembly (43). The piston (45) can be actuated by an electromechanical actuator (44), the control unit carries out the steps of determining a pressure target value ($P_{V,Soll}$) for the pressure supply device (2), performing a pressure control operation or an actuator position control operation on the pressure supply device (2) in accordance with the magnitude of the pressure target value ($P_{V,Soll}$).

20 Claims, 10 Drawing Sheets

(51) Int. Cl.
*B60T 8/40* (2006.01)
*B60T 13/74* (2006.01)
*B60T 7/04* (2006.01)
*B60T 13/66* (2006.01)

(52) U.S. Cl.
CPC ............ *B60T 2201/03* (2013.01); *B60T 7/042* (2013.01); *B60T 8/4054* (2013.01); *B60T 13/662* (2013.01)
USPC .............. 701/36; 701/70; 701/78; 303/115.2; 303/115.4

(56) References Cited

U.S. PATENT DOCUMENTS 6,010,198 A * 1/2000 Nakazawa ................. 303/113.1

| | | | |
|---|---|---|---|
| 2003/0020327 A1 | 1/2003 | Isono et al. | |
| 2003/0160503 A1 | 8/2003 | Riddiford | |
| 2006/0082217 A1 | 4/2006 | Hatano et al. | |
| 2008/0106142 A1* | 5/2008 | Nishino et al. ................... | 303/10 |
| 2008/0210497 A1* | 9/2008 | Jeon ............................ | 188/72.1 |

FOREIGN PATENT DOCUMENTS

| | | |
|---|---|---|
| DE | 102 33 196 A1 | 2/2003 |
| DE | 10 2009 033 499 A1 | 1/2010 |
| DE | 10 2009 008 944 A1 | 8/2010 |
| DE | 10 2010 002 406 A1 | 9/2011 |
| EP | WO 2006/111393 A1 | 10/2006 |
| EP | WO 2008/025797 A1 | 3/2008 |
| FR | 2 924 082 | 11/2007 |

* cited by examiner

METHOD AND CONTROL CIRCUIT FOR CONTROLLING A BRAKING SYSTEM FOR MOTOR VEHICLES

CROSS-REFERENCE TO RELATED APPLICATIONS

This invention relates to German Patent Application Nos. 101010029900.6, filed Jun. 10, 2010, 102010029898.0, filed Jun. 10, 2010, 102010029897.2, filed Jun. 10, 2010, 102011076952.8, filed Jun. 6, 2011, and PCT/EP2011/059320, filed Jun. 7, 2011.

SUMMARY OF THE INVENTION

The invention relates to a method for controlling a braking system for motor vehicles and to a control circuit.

BACKGROUND AND SUMMARY OF THE INVENTION

"Brake-by-wire" braking systems are becoming ever more widespread in the motor vehicle industry. Such braking systems often comprise a pedal decoupling unit, which is inserted ahead of a brake master cylinder, and, as a result, a brake pedal actuation by the driver in the "brake-by-wire" operating mode does not lead to direct actuation of the brake master cylinder by the driver. Instead, the brake master cylinder is actuated by an electrically controllable pressure supply device, i.e. is "externally" actuated, in the "brake-by-wire" operating mode. In order to give the driver a pleasant pedal feel in the "brake-by-wire" operating mode, braking systems generally comprise a brake pedal feel simulation device. In these braking systems, the brake can be actuated on the basis of electronic signals, even without the active intervention of the vehicle driver. These electronic signals can be output by an electronic stability program ESC or an adaptive cruise control system ACC, for example.

International Patent Application WO 2008/025797 A1 discloses a braking system of the above-referenced kind. In order to be able to dispense with expensive temporary storage of hydraulic actuating energy, which is unfavorable in terms of energy, the proposal is that the pressure medium required for electric control of the pressure fed into an intermediate space used for actuating the brake master cylinder should be held ready in the unpressurized form in the pressure supply device and subjected to a higher pressure when required. For this purpose, the pressure supply device is, for example, formed by a cylinder-piston assembly, the piston of which can be actuated by an electromechanical actuator. No method for controlling the braking system, in particular the pressure supply device, is described.

It is therefore the object of the present invention to provide a method for controlling an electrohydraulic "brake-by-wire" braking system having an electrically controllable pressure supply device comprising a cylinder-piston assembly, the piston of which can be actuated by an electromechanical actuator.

This object is achieved by a method in accordance with this invention.

It is advantageous if the method according to the invention is performed in a motor-vehicle braking system which can be activated either by the vehicle driver or independently of the vehicle driver in a "brake-by-wire" operating mode, preferably being operated in the "brake-by-wire" operating mode, and having the capacity for operation in at least one fallback operating mode in which only operation by the vehicle driver is possible.

An actuator position control operation is preferably performed when a mechanical end stop of the actuator is supposed to be detected.

It is likewise preferred that the pressure or actuator position control operation should be followed by an actuator speed control operation, in which the current actuator speed is adjusted to the target value for the actuator speed output by the pressure or actuator position control operation.

It is advantageous if the motor torque output by the motor torque feedforward function is taken into account in the actuator speed control operation.

According to a development of the invention, the pressure target value, advantageously the driver's required pressure target value, is formed from the sum of a first target pressure component and a second target pressure component.

The second target pressure component is preferably determined in accordance with the brake pedal actuation speed and a pedal speed threshold.

The pedal speed threshold is particularly preferably determined using a predetermined functional relationship from a pedal position/travel.

It is advantageous if the pedal speed threshold is selected in accordance with the vehicle speed. Thus, the value calculated for the pedal speed threshold using the functional relationship can additionally be multiplied by a function of the vehicle speed.

According to a preferred embodiment, a quotient of the brake pedal speed and the pedal speed threshold is calculated, and the second target pressure component is determined in accordance with the magnitude of the quotient, wherein the second target pressure component is calculated from the quotient and the first target pressure component, advantageously when the quotient is greater than one.

According to another preferred embodiment, a pressure gradient, in particular an expected pressure gradient, is determined, and a pressure control operation or an actuator position control operation or a combined pressure/actuator position control operation is performed on the pressure supply device in accordance with the magnitude of the pressure target value and/or the magnitude of the pressure gradient.

It is preferred if the pressure target value is used to determine a first component target value for the actuator rotational speed in an actuator position controller and is used to determine a second component target value for the actuator speed in a pressure controller, and if a target value for the actuator speed in a speed control operation on the pressure supply device is determined from the first and second component target values.

The target value for the actuator speed is preferably determined from the first and second component target values by weighted addition. As a particularly preferred option, the respective weighting factor is determined in accordance with the expected pressure gradient. As a very particularly preferred option, the weighting factors are determined from the pressure gradient using at least one predetermined function.

Exclusive pressure control of the pressure supply device is preferably performed if the pressure target value is greater than zero bar and the pressure gradient is less than a predetermined, positive, first value.

Exclusive actuator position control of the pressure supply device is preferably performed if the pressure target value is greater than zero bar and the pressure gradient is greater than a predetermined second value and, in particular, there is no brake control intervention.

It is advantageous if combined pressure/position control of the pressure supply device is performed if the pressure target value is greater than zero bar and the pressure gradient is greater than a predetermined first value and less than a predetermined second value and, in particular, there is no brake control intervention.

BRIEF DESCRIPTION OF THE DRAWINGS

Further preferred embodiments of the invention will become apparent from the dependent claims and from the following description with reference to schematic figures, of which:

DETAILED DESCRIPTION OF THE INVENTION

Figure 1:
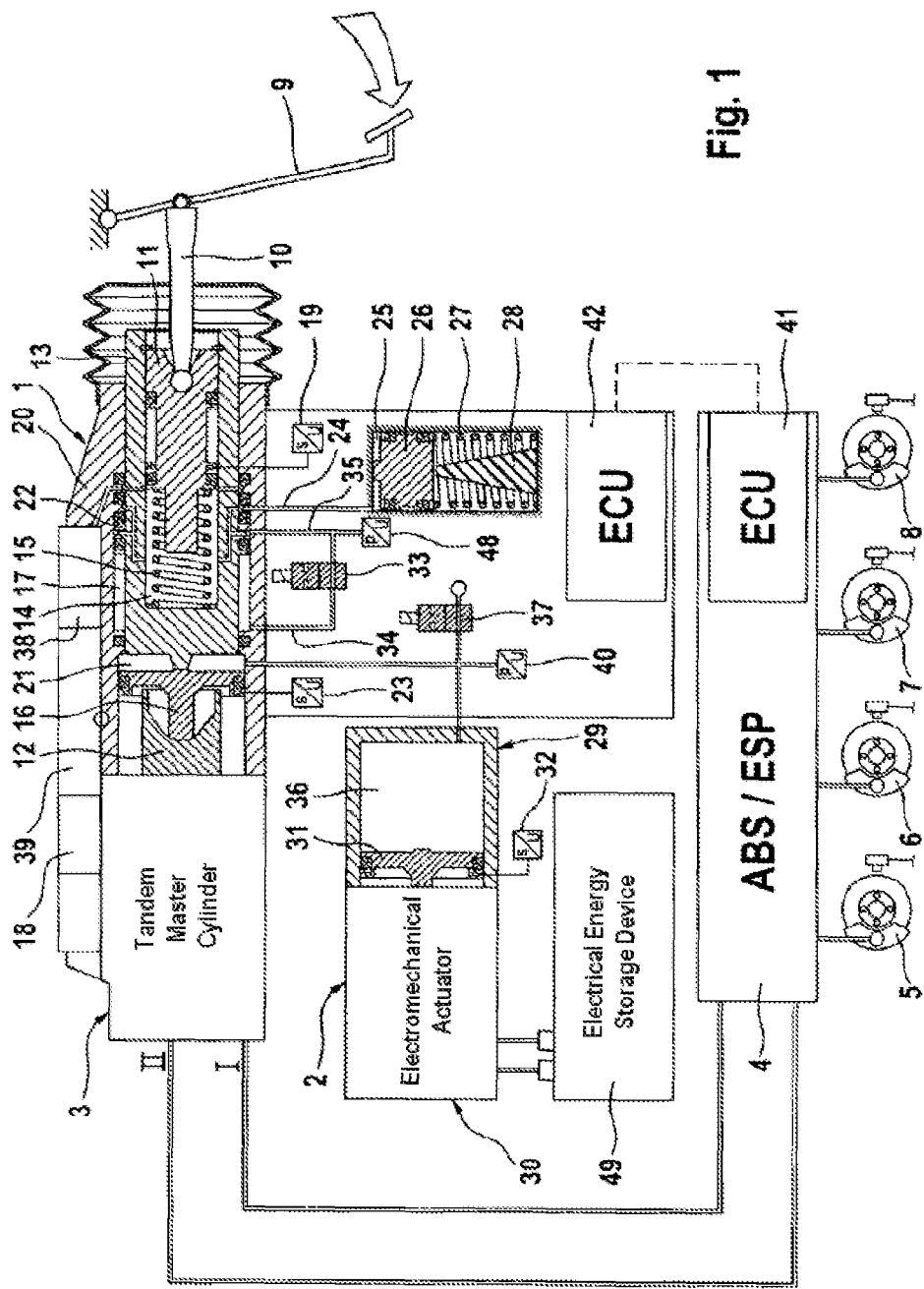
FIG. 1 shows an illustrative basic structure of a known braking system.

The braking system illustrated in FIG. 1 consists essentially of an actuating device 1, a pressure supply device 2, wherein the actuating unit and the pressure supply device form a brake booster, and a brake master cylinder or tandem master cylinder 3, which is effectively inserted downstream of the brake booster and the pressure spaces (not shown) of which can be connected to the chambers of a first pressure medium reservoir 18, said chambers being at atmospheric pressure. On the other hand, the pressure spaces are connected to wheel brake circuits I, II, which supply the wheel brakes 5-8 of a motor vehicle with hydraulic pressure medium via a known ABS or ESP hydraulic unit or a controllable wheel brake pressure modulation module. The wheel brake pressure modulation module 4 is assigned an electronic control and regulation unit 41. The actuating device 1, which is arranged in a housing 20, to which the tandem master cylinder 3 is attached, can be activated by means of a brake pedal 9, which is effectively connected to a first piston 11 of the actuating device 1 by an actuating rod 10. The actuating travel of the brake pedal 9 is detected by means of a travel sensor 19, which is preferably of redundant design and which detects the travel of the first piston 11. However, the same purpose can also be served by using a rotation angle sensor which detects the rotation angle of the brake pedal 9. The first piston 11 is arranged in a second piston 12, delimiting a pressure chamber 14 that accommodates a compression spring 15, the latter bringing the first piston 11 to bear on the second piston 12 when the brake pedal 9 is unactuated. As an alternative or in addition, a pedal return spring can be provided in the region of the push rod 10 or of the brake pedal 9. In the unactuated state of the actuating device 1, the pressure chamber 14 is connected to a chamber 38 of a second pressure medium reservoir 38, 39, which is assigned to the actuating device 1. The second piston 12 interacts with a third piston 13, which can form the primary piston of the tandem master cylinder 3, wherein a pressure intensifying piston 16 is arranged between the second piston 12 and the third piston 13 in the example illustrated. Bounded between the second piston 12 and the pressure intensifying piston 16 is an interspace 21, the admission to which of a hydraulic pressure holds the second piston 12 against a stop 22 formed in the housing 20, while the pressure intensifying piston 16 and hence the primary piston 12 of the tandem master cylinder are acted upon to give a pressure build-up in the tandem master cylinder 3. A movement of the pressure intensifying piston 16 resulting from this loading is detected by means of a second travel sensor 23. Moreover, the second piston 12 delimits a hydraulic chamber 17 in the housing 20, the function of this chamber being explained in the text which follows. A first line 34 is connected to the hydraulic chamber 17, said line being connected via a normally open (NO) shutoff valve 33 to a second line 35, which is connected to the abovementioned pressure chamber 14.

It can furthermore be seen from FIG. 1 that the abovementioned pressure chamber 14 is connected via a connecting line 24 that can be shut off to a hydraulic simulator chamber 25, which is delimited by a simulator piston 26. In this arrangement, the simulator piston 26 interacts with a simulator spring 27 and with an elastomer spring 28 arranged in parallel with the simulator spring 27. In this arrangement, the simulator chamber 25, the simulator piston 26, the simulator spring 27 and the elastomer spring 28 form a pedal travel simulator, which gives the vehicle driver the accustomed pedal feel corresponding to a conventional brake pedal characteristic when the braking system is actuated. This means that, when the brake pedal travel is small, the resistance rises slowly and, when the brake pedal travel is relatively large, it increases disproportionately. To damp the movement of the simulator piston 26, damping means (not shown), e.g. pneumatic damping means, can be provided. The hydraulic connecting line 24 between the simulator chamber 25 and the pressure chamber 14 and the chamber 38 of the second pressure medium reservoir is shut off by a movement of the second piston 12 in the actuating direction of the brake master cylinder 3, thereby switching off the pedal travel simulator in terms of its effect. The first piston 11, the spring 15, the hydraulic chamber 14, the hydraulic connection 24, the simulator chamber 25, the simulator piston 26, the simulator springs 18 and 27 and the damping means (not shown) together form the simulation device which, together with a chamber 38 at atmospheric pressure in the second pressure medium reservoir is assigned to a first brake booster pressure medium circuit, which is completely separate from the wheel brake circuits I, II.

The abovementioned electrohydraulic pressure supply device 2 consists essentially of a hydraulic cylinder-piston assembly 29 and of an electromechanical actuator 30, which is formed, for example, by an electric motor with a reduction gear which provides a translatory movement of a hydraulic piston 31, resulting in a hydraulic pressure build up in a pressure space 36 of the hydraulic cylinder-piston assembly 29. The electromechanical actuator 30 is supplied with power by an electric energy storage device, which is provided with the reference sign 49. The movement of the piston 31 is detected by means of a travel sensor, which is provided with the reference sign 32. On the one hand, the pressure space 36 is connected to the interspace 21 and, on the other hand, can be connected by means of a normally open (NO) 2/2-way valve 37 to a chamber 39 at atmospheric pressure in the second pressure medium reservoir. In this arrangement, the pressure supply device 2, the interspace 21 and the chamber 39 of the second pressure medium reservoir are assigned to a second brake booster pressure medium circuit, which is completely separate both from the first brake booster pressure medium circuit and from the wheel brake circuits I, II. A pressure sensor 40 is used to detect the pressure supplied by the pressure supply device 2 and prevailing in the interspace 21.

The abovementioned shutoff valve 33 makes it possible to shut off the chamber 17 from the pressure chamber 14, thereby preventing a movement of the second piston 12 in the actuating direction. The chamber 17, the first pressure medium line 34, the shutoff valve 33, the second pressure medium line 35, the pressure chamber 14, the connecting line 24, the simulator chamber 25 and the second pressure medium reservoir 38 form a second brake booster pressure medium circuit, which is completely separate from the first brake booster pressure medium circuit and from the two wheel brake circuits I, II. Said elements are assigned a dedicated electronic control unit 42, which interacts with the abovementioned electronic control and regulation unit 41 and serves to detect sensor data, to process said data, to exchange data with other control units (not shown) present in the vehicle, to activate the electromechanical actuator 30 and to activate the brake lights of the vehicle.

The operation of the braking system described above is known, for example, from the international patent application of the applicant cited above in respect of the prior art and does not need to be explained in detail in the text which follows.

Figure 2:
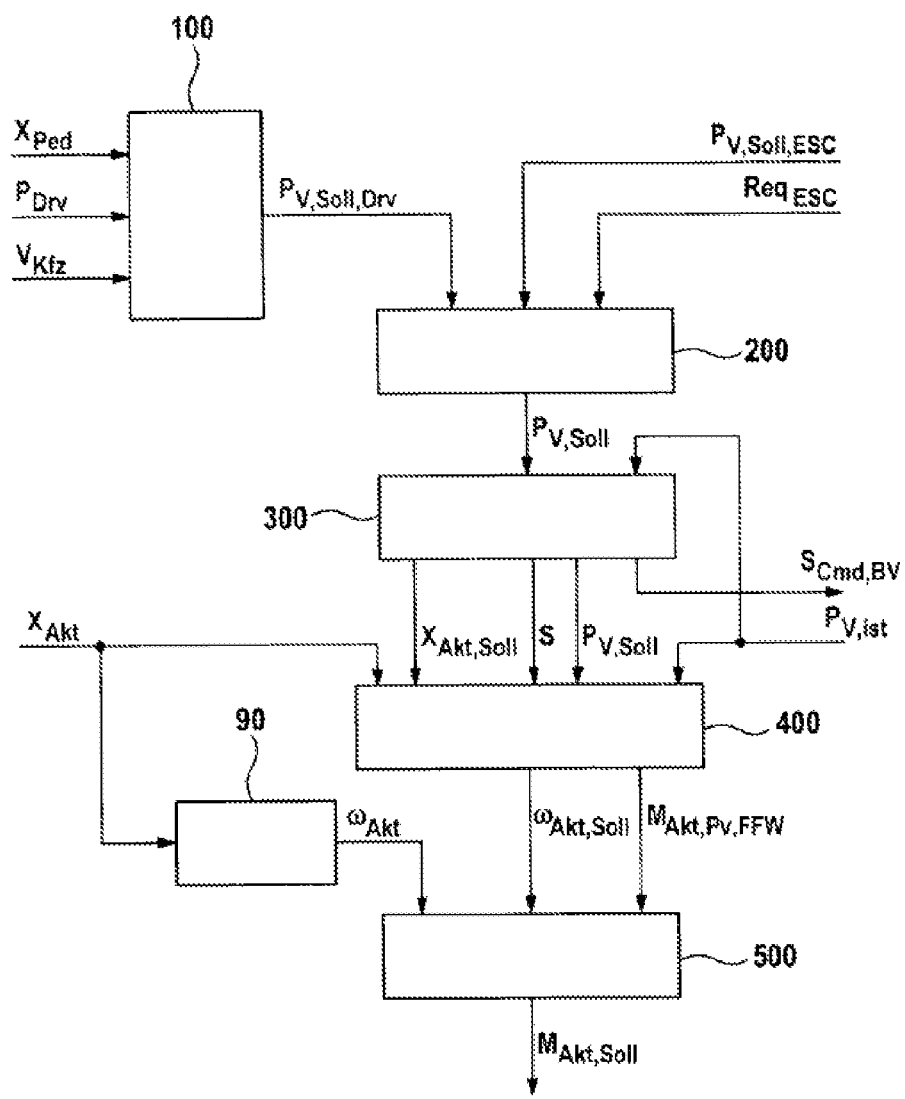
FIG. 2 shows an illustrative control structure for implementing the method according to the invention.

The basic structure of a control system that can be used in the braking system illustrated in FIG. 1 is shown schematically in FIG. 2. It consists essentially of the function blocks "driver requirement detection" 100, "target value selection" 200, "controller selection" 300 and a "pressure/actuator position control" 400, which is followed by an "actuator speed control" 500. In the case of an actuator having an electric motor, the "actuator speed control" 500 corresponds to the rotational speed control of the electric motor.

The actuator speed/rotational speed can be calculated from the actuator position (block 90: "rotational speed calculation").

The functional unit "driver requirement detection" 100 determines the driver requirement from the sensors assigned to the pedal unit and, from this, calculates a signal for the target booster pressure $P_{V,Soll,Drv}$ of the linear actuator.

Depending on the embodiment of braking system, one or more sensor signals are available here to represent the driver requirement. In the illustrative braking system described in connection with FIG. 1, the pedal position is determined in a redundant manner (signal $X_{Ped}$) and the pedal force produced by the driver is determined by means of a pressure sensor (signal $P_{Drv}$). In the example, the driver requirement detection unit 100 thus has two physically independent items of information for the driver actuation representing the driver's braking requirement for target value generation of the required braking force intensification by means of the actuator.

The output variable of the functional unit "driver requirement detection" 100 is a pressure target value (pressure target value of the actuator, signal $P_{V,Soll,Drv}$) determined on the basis of the driver pedal actuation, said value corresponding at least statically to the brake pressure in the wheel brakes as long as there are no interventions by the higher-ranking pressure control system (e.g. antilock system, vehicle dynamics control system or the like), e.g. ESP pressure control system (ESP: Electronic Stability Program).

As an option, the functional unit "driver requirement detection" 100 is supplied with the vehicle speed $V_{Kfz}$. The pressure target value $P_{V,Soll,Drv}$ can then be additionally modified in accordance with the vehicle speed $V_{Kfz}$.

The functional unit "driver requirement detection" 100 is described in greater detail in connection with FIG. 3. As already mentioned above, the functional unit "driver requirement detection" 100 determines the driver requirement from the sensors assigned to the pedal unit and, from this, calculates a signal for the pressure target value $P_{V,Soll,Drv}$ of the actuator.

Improved driver requirement detection is achieved by additionally taking into account the pedal depression speed $V_{Ped}$. In contrast to known braking assistant functions, which adjust to the maximum pressure as soon as the trigger criteria, which are decisively determined by the pedal depression speed, are met, account is now taken here of the degree to which the trigger threshold is exceeded.

Figure 3:
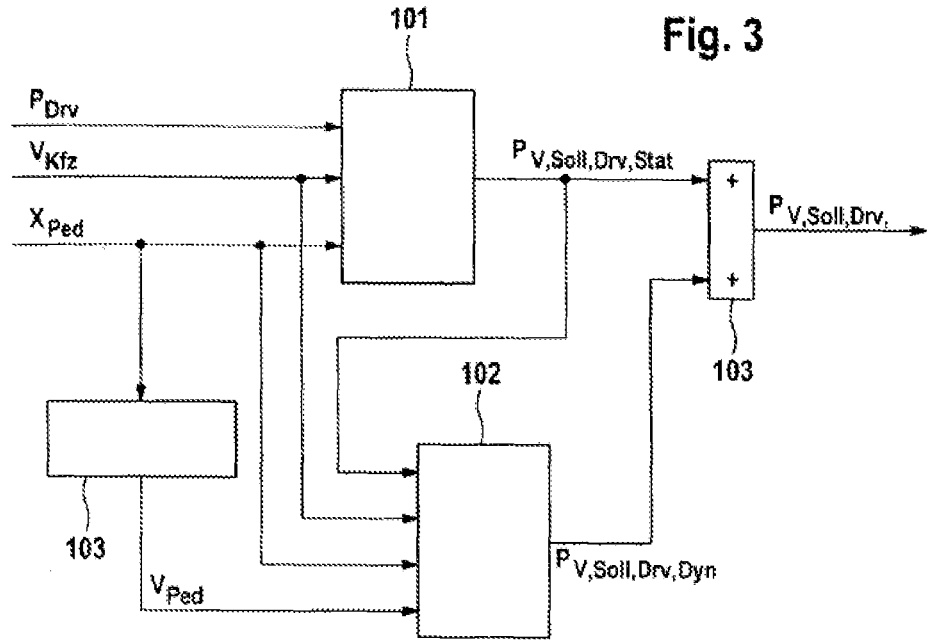
FIG. 3 shows an illustrative embodiment of a brake pressure target value calculation.

FIG. 3 shows a basic structure of an illustrative driver requirement detection unit, which is expanded by the calculation and superimposition of a dynamic pressure component. The function block 101 "driver requirement calculation" illustrated in FIG. 3 supplies a static pressure target value component $P_{V,Soll,Drv,Stat}$ based on known functions/methods. For example, the static pressure target value component $P_{V,Soll,Drv,Stat}$ can be determined from one or more variables by means of a model, using a predetermined functional relationship f. Thus, for example, the static pressure target value component can be calculated from the pedal position/actuation $X_{Ped}$ using a function $P_{V,Soll}=f(X_{Ped})$ or, more generally, from the pedal position $X_{Ped}$, the pedal force (or corresponding pressure) $P_{Drv}$, and the vehicle speed $V_{Kfz}$ using a function $P_{V,Soll}=f(X_{Ped}, P_{Drv}, V_{Kfz})$.

The pedal depression speed $V_{Ped}$ can be determined, for example, from the pedal position $X_{Ped}$ or the time variation thereof (function block 103 "calculation of pedal speed").

The function block "calculation of dynamic pressure component" 102 determines, essentially from the pedal speed $V_{Ped}$, a dynamic pressure target value component $P_{V,Soll,Drv,Dyn}$, which depends decisively on the extent to which the pedal speed threshold has been exceeded. As can be seen from FIG. 3, the two pressure target value components $P_{V,Soll,Drv,Stat}$ and $P_{V,Soll,Drv,Dyn}$ are added together in an adder 103 to give a pressure target value $P_{V,Soll,Drv}$.

Figure 4:
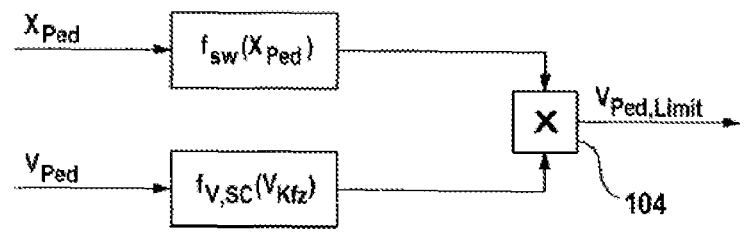
FIG. 4 shows an illustration relating to the determination of a brake pedal speed threshold.

The block diagram shown in FIG. 4 shows the formation of the pedal speed threshold $V_{Ped,Limit}$ mentioned in the previous paragraph. The speed threshold $V_{Ped,Limit}$ can be defined as a preset value or can be determined in accordance with the pedal travel $X_{Ped}$ in the form using a functional relationship $V_{Ped,Limit}=f_{sw}(X_{Ped})$. Here, the functional relationship $f_{sw}(X_{Ped})$ can be defined in the form of a static equation (function $f_{sw}$) or, alternatively, as a table.

As is apparent from FIG. 4, it is also possible additionally to scale the speed threshold $V_{Ped,Limit}$ that has been defined or determined on the basis of the pedal travel $X_{Ped}$ in accordance with the vehicle speed $V_{Kfz}$. Scaling is performed in a multiplier, which is indicated by the letter X and is provided with the reference sign 104. By this means, it is possible, for example, to ensure that this dynamic pressure component does not take effect or takes effect only in an attenuated way at relatively low vehicle speeds or when stationary, while coming fully into play when traveling, depending on the design criterion.

Figure 5:
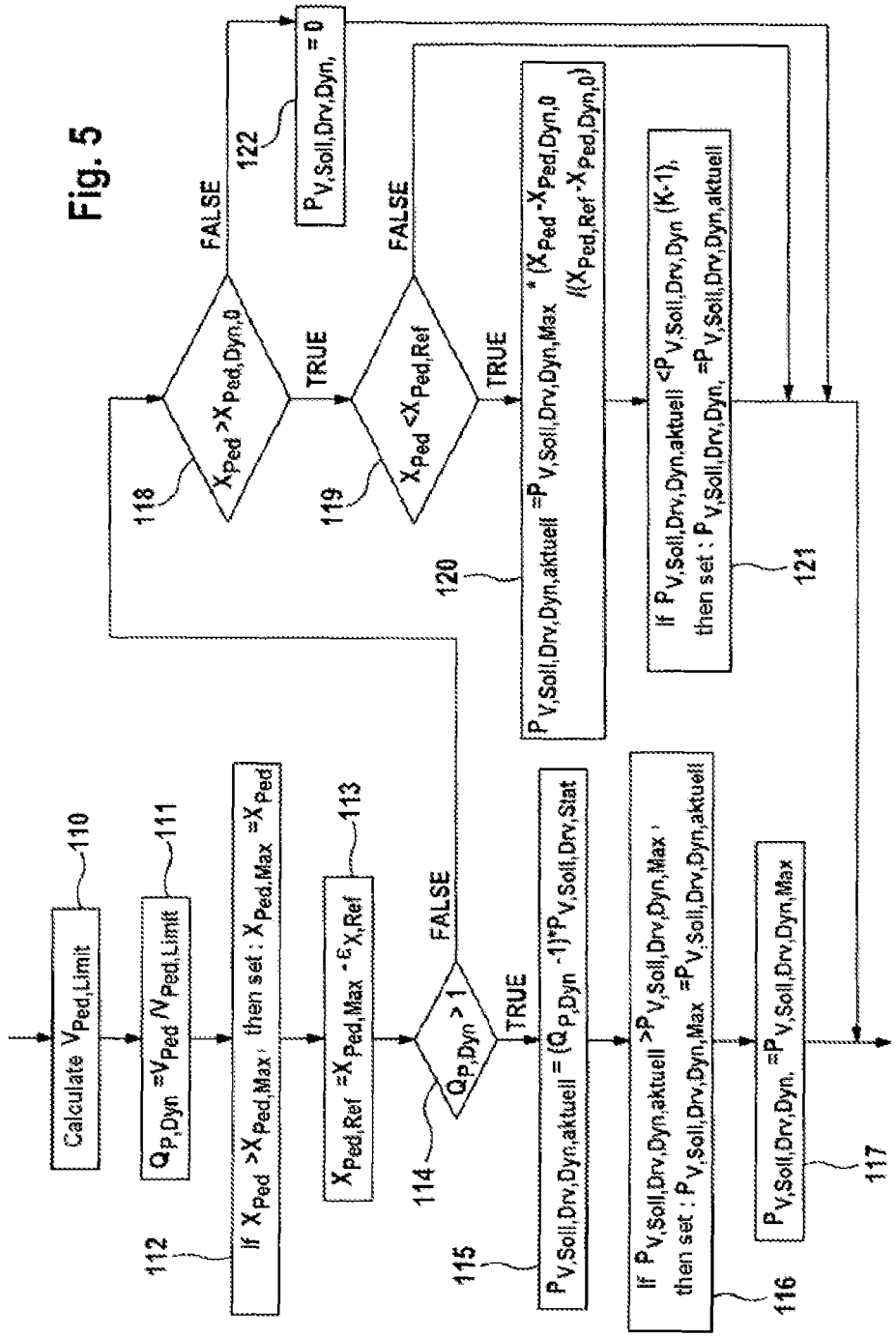
FIG. 5 shows a flow diagram relating to the determination of a dynamic target pressure component.

The formation, illustrated in FIG. 4, of the pedal speed threshold $V_{Ped,Limit}$ is represented in FIG. 5 by function block 110. As a measure of the extent to which the current pedal speed threshold $V_{Ped,Limit}$ determined is exceeded, said threshold being determined in block 110 in accordance with the pedal travel $X_{Ped}$, the quotient of the pedal speed $V_{Ped}$ and the pedal speed threshold $V_{Ped,Limit}$ is formed (block 111):

$$Q_{P,Dyn} = V_{Ped}/V_{Ped,Limit}$$

In the case where the current pedal travel $X_{Ped}$ represents the maximum pedal travel $X_{Ped,Max}$ occurring during the current brake actuation, this value is adopted as the new maximum $X_{Ped,Max}$ in function block 112. In the following block 113, the current maximum value determined for the pedal travel $X_{Ped,Max}$ is used to calculate a reference travel $X_{Ped,Ref}$ which is obtained by subtracting a tolerance threshold $\epsilon_{X,Ref}$ from $X_{Ped,Max}$. The reference travel $X_{Ped,Ref}$ represents a travel threshold that is relevant for the reduction of the dynamic target pressure component when the brake is released.

In enquiry block 114, a check is made to determine whether the quotient $Q_{P,Dyn} > 1$. If this condition is met, a dynamic pressure component is calculated in accordance with $$P_{V,Soll,Drv,Dyn,aktuell} = (Q_{P,Dyn} - 1) * P_{V,Soll,Drv,Stat}$$

(block 115).

In the case where this component $P_{V,Soll,Drv,Dyn,aktuell}$ represents the maximum of the dynamic pressure component, said maximum being calculated during the current brake actuation, this value is adopted as a new maximum $P_{V,Soll,Drv,Dyn,Max}$ (function block 116). In function block 117, the maximum thus determined for the dynamic pressure component is assigned to the variable $P_{V,Soll,Dyn}$, which represents the signal for the dynamic pressure component, which, as the output variable of function block 102, is then superimposed by addition on the target booster pressure $P_{V,Soll,Drv,Stat}$ (see FIG. 3).

When the brake is released (i.e. $V_{Ped} < 0$), this dynamic pressure component $P_{V,Soll,Drv,Dyn}$ is reduced again to the value 0. For reasons of comfort, this reduction in the dynamic pressure target value takes place in accordance with the pedal travel, more specifically in such a way that, from the reference travel $X_{Ped,Ref}$ determined in block 113 during the brake actuation, said travel depending on the maximum pedal travel detected during the braking operation, a reduction is carried out in a linear manner with the travel $X_{Ped}$ to the value $X_{Ped} = X_{Ped,Dyn,0}$, reducing it to zero. FIG. 5 illustrates this procedure in the form of a flow diagram (blocks 118-122).

If it is ascertained in enquiry block 114 that the quotient $Q_{P,Dyn} \leq 1$, then the brake actuation concerned is one which does not require any further increase in the dynamic pressure component, or the brake is being released. First of all, a check is made in enquiry block 118 to determine whether the pedal travel $X_{Ped}$ is greater than the lower threshold $X_{Ped,Dyn,0}$. If this is not the case, this lower threshold has been undershot and the dynamic pressure target value is set to zero, $P_{V,Soll,Dyn} = 0$ (block 122). If the pedal travel $X_{Ped}$ is greater than the lower threshold $X_{Ped,Dyn,0}$, a check is made in enquiry block 119 to determine whether the upper threshold, given by the reference travel $X_{Ped,Ref}$, which is necessary for the reduction of the dynamic pressure target value, has been undershot. If this is the case, then, in function block 120, the maximum value $P_{V,Soll,Drv,Dyn,Max}$ determined during the braking operation is reduced in a linear manner with the pedal travel $X_{Ped}$ and assigned to the signal $P_{V,Soll,Drv,Dyn,aktuell}$. If this value is less than the dynamic pressure target value $P_{V,Soll,Drv,Dyn}$ (k-1) of the preceding sampling step (k-1), then, in function block 121, this value $P_{V,Soll,Drv,Dyn,aktuell}$ is assigned to the variable $P_{V,Soll,Dyn}$, which represents the signal for the dynamic pressure component, and this in turn is then superimposed by addition, as the output variable of function block 102, on the target booster pressure $P_{V,Soll,Drv,Stat}$ (see FIG. 3).

If it is ascertained in enquiry block 119 that the current pedal travel $X_{Ped}$ is greater than or equal to the reference travel $X_{Ped,Ref}$, the dynamic pressure target value $P_{V,Soll,Drv,Dyn}$ (k-1) of the preceding sampling step (k-1) is retained unaltered.

When the brake pedal is depressed rapidly, the above-described procedure for taking into account the pedal speed $V_{Ped}$ leads to a shift in the relationship $P_{V,Soll} = f(X_{Ped})$ and $P_{V,Soll} = f(X_{Ped}, P_{Drv}, V_{Kfz})$ to ward higher booster and hence also higher brake pressures, this effect being all the more pronounced, the faster the driver actuates the brake pedal. In the case of fast brake pedal actuation, the target booster pressure $P_{V,Soll,Drv}$ in the linear actuator is already reached at shorter brake pedal travels $X_{Ped}$ than is the case with a slow actuation. This leads to an increase in the dynamic response of the braking system combined with more rapid response from the brake to driver actuation (shortening of the response time). In the case of a slow pedal actuation ($V_{Ped}$ short), or ($0 < Q_{P,Dyn} < 1$), this dynamic pressure component is not present, and therefore the determination of the target booster pressure in this case can be designed primarily according to comfort criteria. If rapid brake responses are required by the driver, this is achieved by means of the component $P_{V,Soll,Drv,Dyn}$.

It is likewise advantageous in terms of actuating comfort and ensuring predictable behavior that the dynamic component is not reduced abruptly when the brake or brake pedal is released but in a linear manner with the pedal travel back to the value 0.

Figure 6:
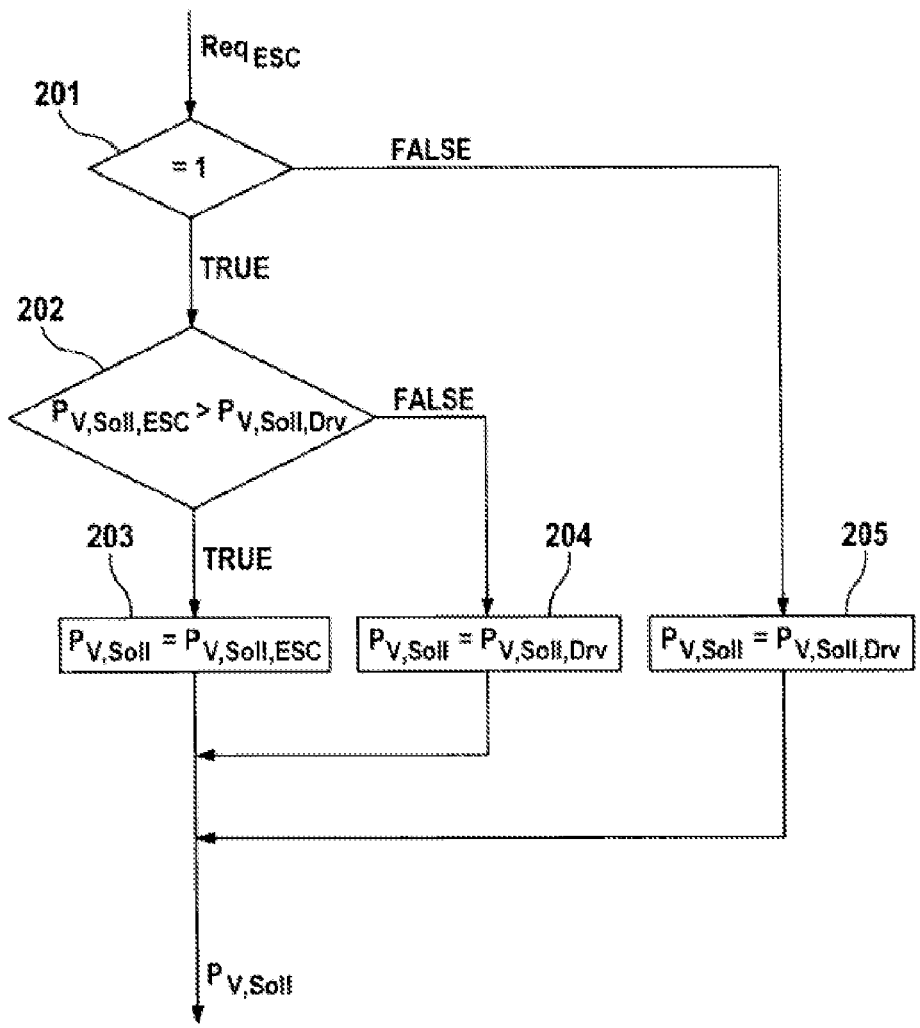
FIG. 6 shows a flow diagram relating to the determination of the brake pressure target value.

In addition to the above-described target value $P_{V,Soll,Drv}$ based on driver pedal actuation, the higher-ranking pressure control system can also demand a pressure target value $P_{V,Soll,ESC}$ in accordance with its control strategy (ABS (antilock system), TCS (traction control system), ESP or the like). A target value selection is therefore performed in block 200 (FIG. 2). The output variable of this function block 200 is the resulting pressure target value $P_{V,Soll}$. An illustrative target value selection is shown in FIG. 6. In enquiry block 201, a check is made to determine whether a control signal $Req_{ESC} = 1$. If this condition is met, a check is made in enquiry block 202 to determine whether the inequality $P_{V,Soll,ESC} > P_{V,Soll,Drv}$ is satisfied. In the case of an active demand, the pressure target value $P_{V,Soll}$ is obtained from the maximum value of the two values $P_{V,Soll,ESC}$ and $P_{V,Soll,Drv}$ (see function blocks 203 and 204).

If the abovementioned condition is not met, there is no pressure demand from the higher-ranking control system, and therefore the signal $P_{V,Soll,Drv}$ is output as the target value for actuator control (see function block 205).

Controller selection in function block 300 is performed in accordance with the pressure target value $P_{V,Soll}$ determined (see FIG. 2). If the target pressure $P_{V,Soll} > 0$ bar, pressure/actuator position control (function block 400, FIG. 2) is activated (selection parameter S=1), which sets the desired pressure. At the same time, the hydraulic connection between the actuator and the reservoir is interrupted (e.g. by energizing the normally open control valve 37 arranged between the cylinder-piston assembly 30 and the reservoir 39 (activation signal $S_{Cmd,BV}$), which valve is therefore closed). The actuator position controller (block 400) is activated or a switch is made from the pressure controller to the position controller (selection parameter S=0) as soon as the target pressure is $P_{V,Soll}$=0 bar and the current booster pressure $P_{V,Ist}$ is less than a predefined minimum pressure threshold $P_{V,Ist,Min}$. In this case, the abovementioned valve 37 is also opened again to enable the actuator to draw in an additional volume of fluid from the reservoir 39 if required. Here, the target value for the actuator position corresponds to the zero position of the actuator, which is to be approached with a defined actuator speed and in which the actuator is in an unactuated state. In this position, the braking system does not build up any brake pressure.

Actuator position control is likewise activated, in the context of an initialization routine when starting the program, in order to determine the zero position of the actuator ($X_{Akt,0}$) by detection of the mechanical rear end position ($X_{Akt,Mech,0}$). For this purpose, the position target value is ramped down slowly with the reservoir valve 37 open until the linear actuator reaches its rear end position. In this case, the movement of the actuator comes to a halt and the motor torque rises sharply. These two criteria are evaluated in order to detect $X_{Akt,Mech,0}$. Once this has been done, the zero position of the actuator $X_{Akt,0}=X_{Akt,Mech,0}+\Delta X_{Akt,0}$ is adopted, likewise with the reservoir valve BV open. The offset value $\Delta X_{Akt,0}$ represents a defined safety clearance, which is intended to prevent the actuator from striking against the rear end position during normal operation of the brake control system (e.g. due to undershooting by the control system). By means of the selection parameter S, either the actuator position controller or the booster pressure controller is activated in block 400. Both controllers have a target value for the actuator speed as an output variable, this corresponding in the example to the motor speed $\omega_{Akt,Soll}$.

The pressure controller is activated if there is a braking demand and a defined booster pressure $P_{V,Soll}$ is to be set. An illustrative embodiment of a pressure controller 401 with a downstream actuator rotational speed controller 501 is illustrated schematically in FIG. 7. The pressure controller 401 adjusts the deviation $\Delta P$, formed in a subtraction element 409, between the requested target booster pressure $P_{V,Soll}$ and the currently prevailing actual booster pressure $P_{V,Ist}$ by specifying a target speed $\omega_{Akt,Soll,DR,Ctrl}$. A controller with a proportional action is sufficient for the controller response. To increase the dynamic response of the pressure controller, two feedforward functions can be used: speed feedforward and motor torque feedforward.

The speed feedforward function determines a target pressure speed from the pressure target value $P_{V,Soll}$ by differentiation (function block 402: calculation of target pressure change), which, weighted with an intensification factor $K_{Prs,1}$ (function block 403), superimposes an additional component $\omega_{Akt,Soll,DR,FFW}$ on the output variable of the pressure controller $\omega_{Akt,Soll,DR,Ctrl}$. The two rotational speed target value components $\omega_{Akt,Soll,DR,FFW}$, $\omega_{Akt,Soll,DR,Ctrl}$ are added together in an adder 404 and fed to a limiting function 405 for limitation to the minimum or maximum permissible target rotational speed ($\omega_{Min}$, $\omega_{Max}$). Said minimum and maximum values for the rotational speed target values $\omega_{Min}$, $\omega_{Max}$ are calculated in a rotational speed target value calculation module 406, to which the signal $X_{Akt}$ representing the actuator travel is fed as an input variable.

The target value, limited in this way, for the rotational speed of the actuator is described by $\omega_{Akt,Soll,DR}=\omega_{Akt,Soll}$ and, when pressure control is activated by the function block "controller selection" 300 (FIG. 2) with S=1, represents the output variable $\omega_{Akt,Soll}$ of the function block "pressure/actuator position control" 400.

The second feedforward component for increasing the dynamic response of the controller comprises the calculation and direct stipulation of the motor torque $M_{Akt,PV}$ corresponding to the pressure target value $P_{V,Soll}$ by function block 407 ("calculation of feedforward torque"), to which the abovementioned system variables $P_{V,Soll}$, $P_{V,Ist}$ and the output variable of the rotational speed target value calculation module 406 are fed as input variables. With the aid of the intensification factor $K_{Prs,2}$ (where $K_{Prs,2}$ is between 0 and 1) (function block 408), it is possible to define the weighting of this torque feedforward component; in this case, a value of $K_{Prs,2}=1$ signifies a 100% weighting. The output variable of the torque feedforward function, which simultaneously also supports the rotational speed controller, is then the signal $M_{Akt,PV,FFW}$, which is processed in the rotational speed control unit 500 described below.

Figure 7:
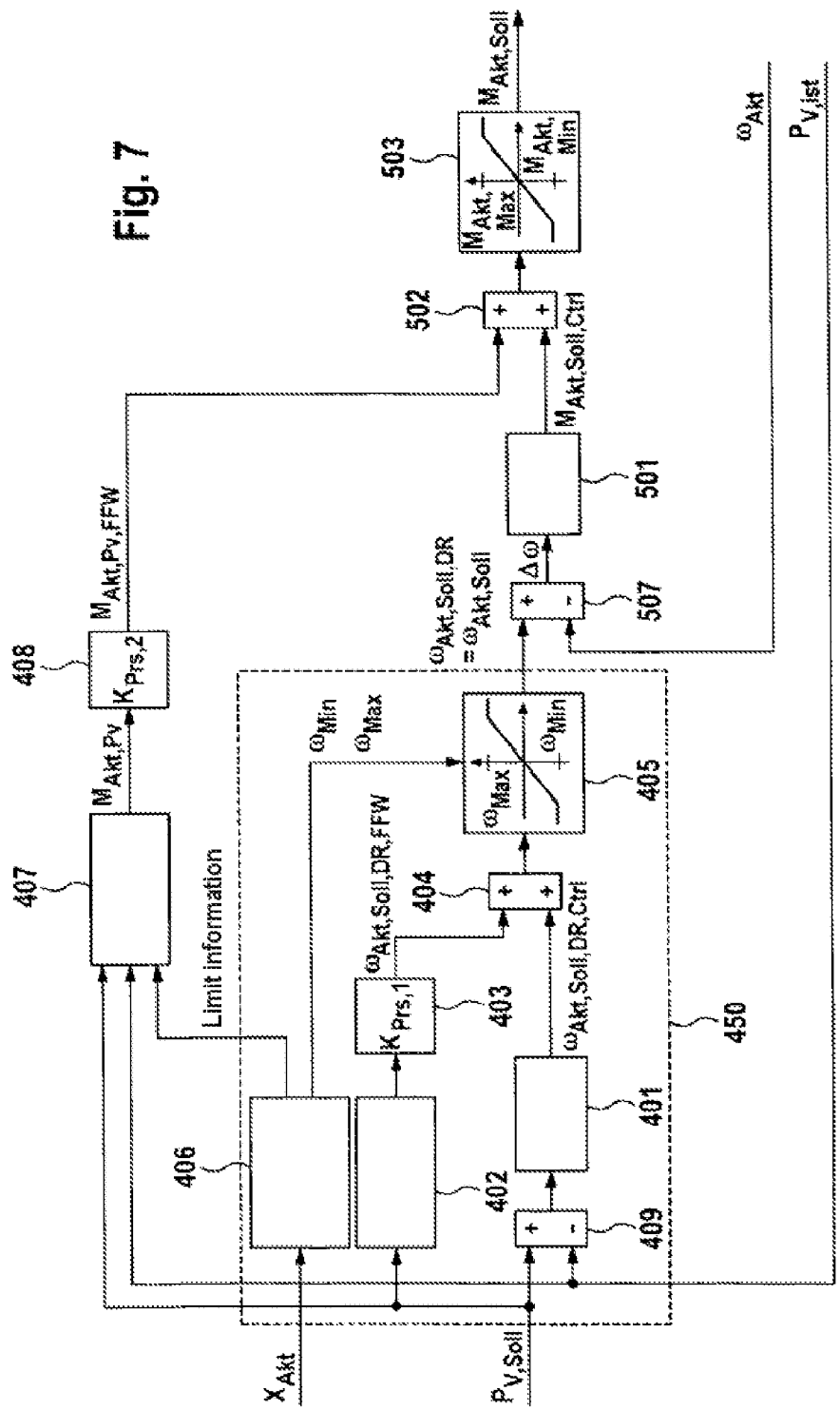
FIG. 7 shows an illustrative embodiment of a pressure controller according to the invention with downstream rotational speed control.
Figure 8:
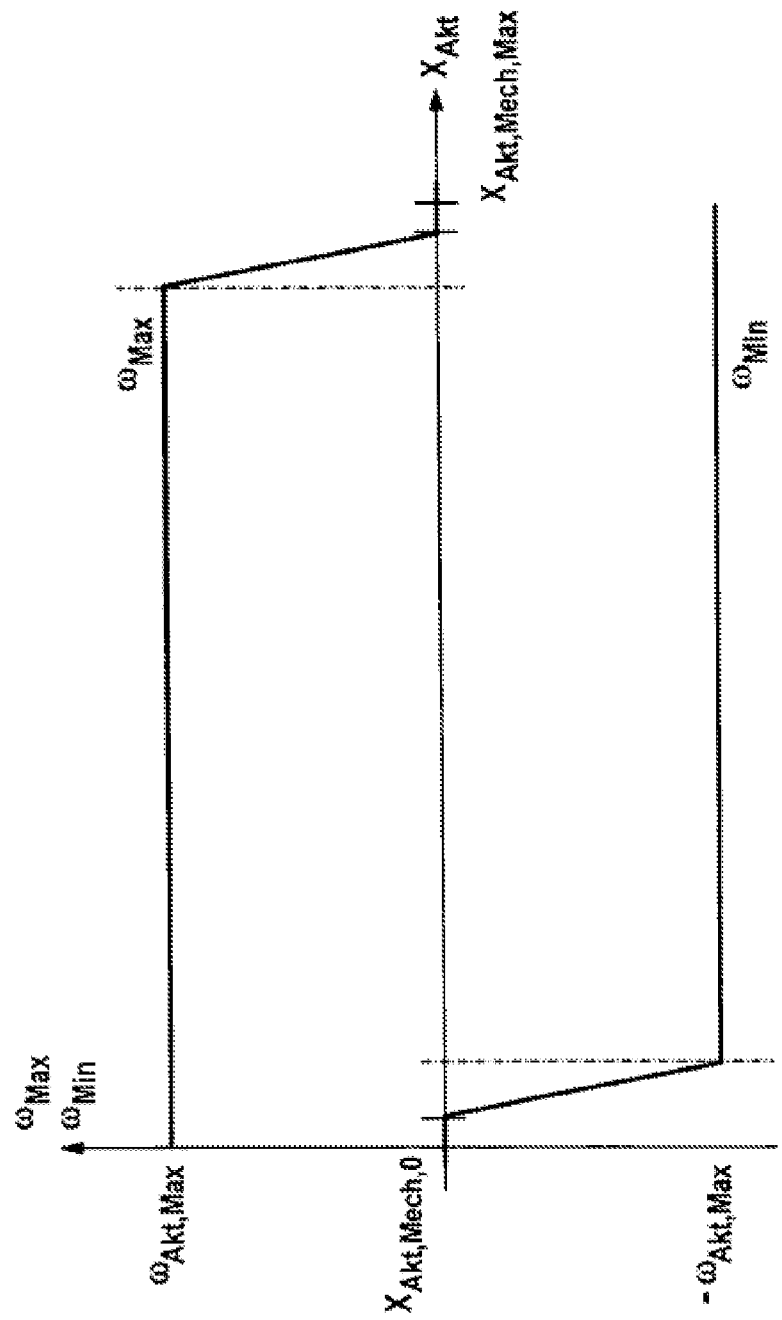
FIG. 8 shows an illustrative target rotational speed limiting operation.

As can furthermore be seen from FIG. 7, the output signal $\omega_{Akt,Soll}$ of the rotational speed limiting function 405 is fed to a subtraction element 507, in which the actual value of the actuator rotational speed $\omega_{Akt}$ is subtracted from $\omega_{Akt,Soll}$. The result $\Delta\omega$ of the subtraction is fed as an input variable to an actuator rotational speed controller 501, the output variable $M_{Akt,Soll,Ctrl}$ of which represents a target value for the abovementioned actuator torque, with an addition of the target value to the output value $M_{Akt,PV,FFW}$ of the abovementioned function block 408 being performed in an adder 502. The result of the addition is finally subjected to a torque limitation function 503, the output variable $M_{Akt,Soll}$ of which represents the torque target value. The signal characteristics, which represent the dependence of the actuator rotational speed limiting values $\omega_{Min}$, $\omega_{Max}$ on the actuator position $X_{Akt,Mech}$, are illustrated in FIG. 8.

In normal operation of the brake and of the pressure control system, the actuator is in a position in which no limitation of the target rotational speed (especially in the direction of "brake actuation") is active in the control system (i.e. $\omega_{Max}=\omega_{Akt,Max}$). In this case, the motor torque $M_{Akt,PV}$ is determined from the target value $P_{V,Soll}$ for the booster pressure. When the actuator position approaches the mechanical front end position, the rotational speed limiting function 503 is activated. Since it must be assumed in this case that the pressure target value $P_{V,Soll}$ demanded cannot be set, the motor torque $M_{Akt,PV}$ is then additionally determined on the basis of the current actual pressure value $P_{V,Ist}$. The resulting feedforward torque to be output to the rotational speed control system is then obtained from a weighted superimposition of the two component torque target values, wherein the weighting of the value determined from the pressure target value decreases, the greater the limitation, while the weighting of the variable determined from the actual pressure value increases to the same extent.

Figure 9:
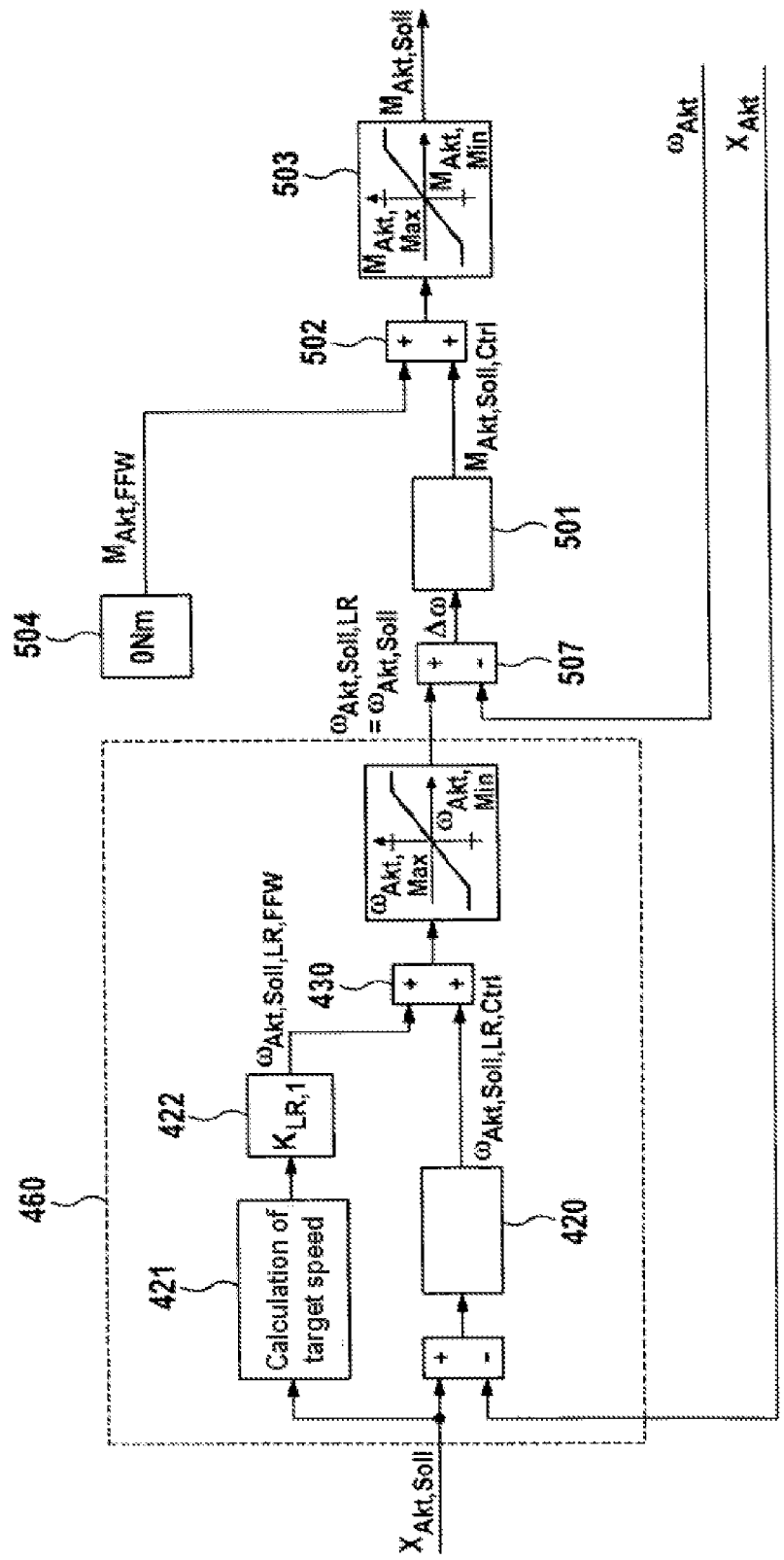
FIG. 9 shows an illustrative embodiment of an actuator position controller according to the invention with downstream rotational speed control.

In normal operation of the braking system, the actuator position controller is activated with S=0 when the brake is supposed to be released (see description of "controller selection" 300, FIG. 2). An illustrative basic structure 460 of the position controller 420 with a downstream actuator rotational speed controller 501 is illustrated in FIG. 9 in the form of a block diagram. Here too, a speed feedforward function 421, 422 is superimposed in parallel on the position controller 420 in order to boost the dynamic response. Since, in this controller mode, the pressure target value $P_{V,Soll}=0$ bar, no torque feedforward is required here, for which reason this value is set to a defined value of $M_{Akt,PV,FFW}=0$ Nm (function block 504).

The task of the rotational speed controller 501, which generally has a proportional-integral (PI) action, is to ensure as rapid and accurate as possible setting of the target rotational speed $\omega_{Akt,Soll}$ demanded and compensation of the load torques acting on the actuator, said torques being caused, in the case of the actuator, essentially by the pressure set.

To improve the controller structure described above, the function blocks "controller selection" 300 and "pressure/actuator position control" 400 are expanded in order to improve the pressure controller behavior in respect of the maximum pressure build up dynamics, especially in the case of a rapid pressure build up. For this purpose, combined pressure/position control is performed. By way of example, in certain braking situations (e.g. in the case of a rapid pressure build up), both controllers are simultaneously active and make a contribution, weighted by a factor, to the controller output, motor target rotational speed $\omega_{Akt,Soll}$.

Figure 10:
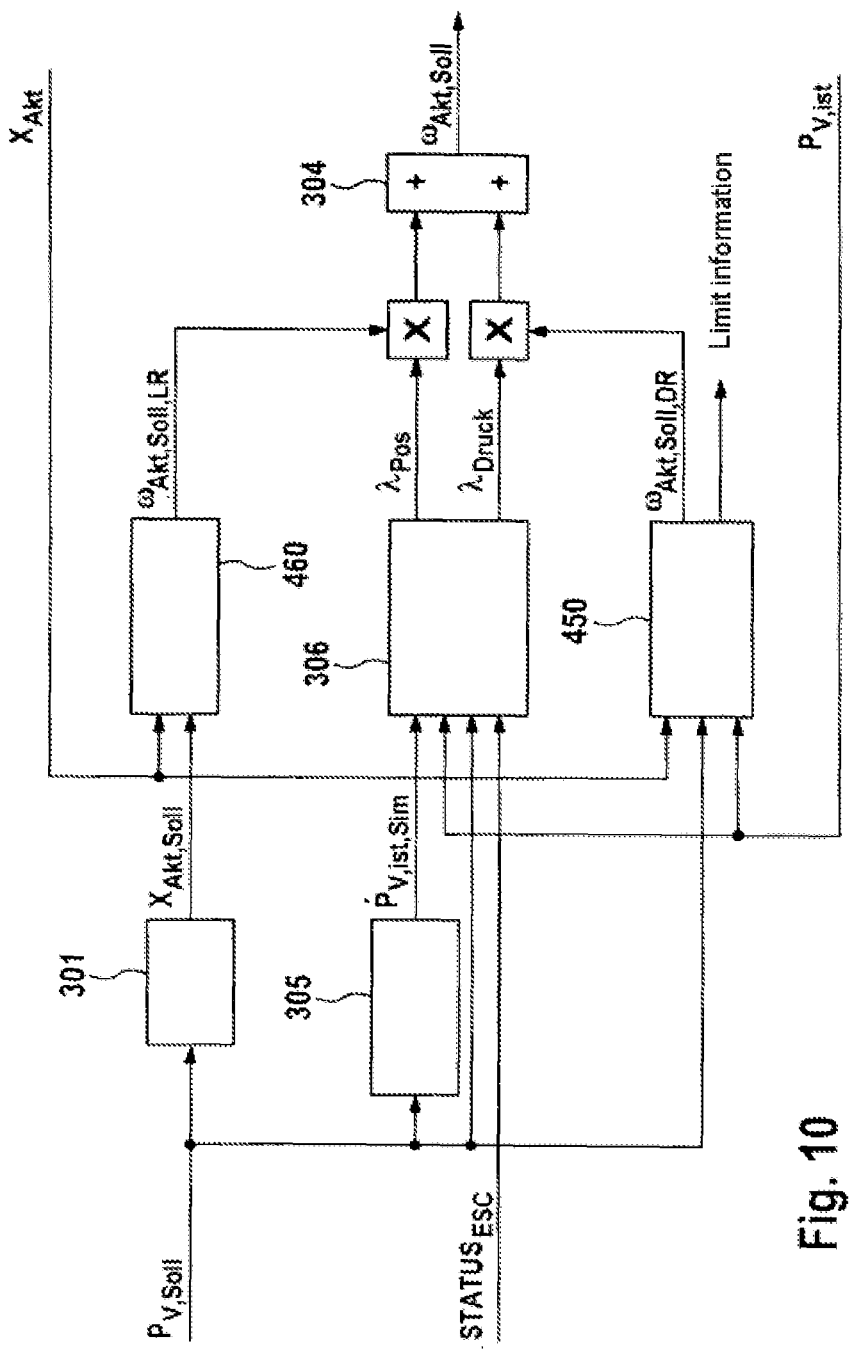
FIG. 10 shows a development of the pressure/actuator position controller shown in FIGS. 7 and 9.

FIG. 10 shows a block diagram of an illustrative combined pressure/position control system. The pressure target value $P_{V,Soll}$ is used to determine an actuator travel target value $X_{Akt,Soll}$ corresponding to the pressure target value in function block 301 by means of a pressure model. Various embodiments of actuator position controllers 460 and pressure controllers 450 are conceivable. As an option, the actual actuator position $X_{Akt}$ is fed to the pressure controller 450 as an input variable (in order to determine a rotational speed limiting target value).

The two controllers 460, 450 operate in parallel and supply controller outputs $\omega_{Akt,Soll,LR}$ and $\omega_{Akt,Soll,DR}$ for the actuator rotational speed in accordance with the controller algorithm provided. The resulting controller output as a rotational speed target value $\omega_{Akt,Soll}$ for the lower-ranking rotational speed controller is then obtained in the adder 304 by addition of the two component target values, which are multiplied by a weighting factor $\lambda_{Pos}$ and $\lambda_{Druck}$ respectively. The two weighting factors are determined in a function block 306 "determination of controller weighting factor", upstream of which there is a function block 305. Here, it is advantageous if the following applies to the two weighting factors: $\lambda_{Druck}+\lambda_{Pos}=1$. The weighting factors $\lambda_{Druck}$ and $\lambda_{Pos}$ determine to what extent the individual controllers contribute.

The function block "simulation of pressure controller dynamic response" 305 serves to determine a value for the pressure gradient $dP_{V,Ist,Sim}/dt$ on the basis of the current pressure target value $P_{V,Soll}$ and a model for the dynamic behavior of the closed pressure control circuit, in particular taking into account the maximum possible pressure gradient.

If a rapid pressure build up is required on the basis of the input information and if there are no control interventions by the higher-ranking ESC control system ($STATUS_{ESC}=0$), the controller output of the actuator position controller 460 is weighted with a large weighting factor $\lambda_{Pos}\approx 1$. As a result, the actuator moves in a controlled manner to a position value $X_{Akt,Soll}$, which corresponds approximately to the target booster pressure $P_{V,Soll}$ demanded, irrespective of the pressure information $P_{V,Ist}$ (and hence without being influenced by the backpressure information). In the case of decreasing values of $dP_{V,Ist,Sim}/dt$, the parameter $\lambda_{Pos}$ becomes smaller, while $\lambda_{Druck}$ increases in a corresponding manner. As a result, the pressure controller 450 is more heavily weighted and can ensure the steady-state accuracy of the overall control system on the basis of the available pressure information.

In the case of slow pressure changes and in the case of a pressure reduction, the parameter $\lambda_{Pos}$ approaches the value 0, in which case only the pressure controller 450 is then active and sets the pressure target value demanded with greater accuracy on the basis of the measured pressure information.

By means of this measure, it is ensured that the pressure controller behavior in the case of a rapid pressure build up is improved in respect of the maximum pressure build up dynamic response in comparison with a simple pressure controller.

An illustrative mode of operation of the function block "determination of controller weighting factor" 306 illustrated in FIG. 10 can be described by:

$\lambda_{Pos}=1$ and hence $\lambda_{Druck}=0$, i.e. only actuator position controller 460
  when $P_{V,Soll}=0$ and $P_{V,Ist}<P_{V,\epsilon}$ (release brake, $X_{Akt,Soll}=0$)
or
  when $P_{V,Soll}>0$ and $dP_{V,Ist,Sim}/dt>dP_{V,\epsilon 2}$ and $STATUS_{ESC}=0$, $\lambda_{Pos}=0$ and hence $\lambda_{Druck}=1$, i.e. only pressure controller 450
  when $STATUS_{ESC}<>0$ (intervention by a higher-ranking pressure control system)
or
  when $P_{V,Soll}>0$ and $dP_{V,Ist,Sim}/dt<dP_{V,\epsilon 1}$ with predetermined parameter $dP_{V,\epsilon 1}>0$, $0<\lambda_{Pos}=f(dP_{V,Ist,Sim}/dt)<1$ and $\lambda_{Druck}=1-\lambda_{Pos}$, i.e. combined pressure/actuator position control
  when $STATUS_{ESC}=0$ and $P_{V,Soll}>0$ and $dP_{V,\epsilon 1}<dP_{V,Ist,Sim}/dt<dP_{V,\epsilon 2}$ with predetermined parameters $dP_{V,\epsilon 1}$ and $dP_{V,\epsilon 2}$.

Figure 11:
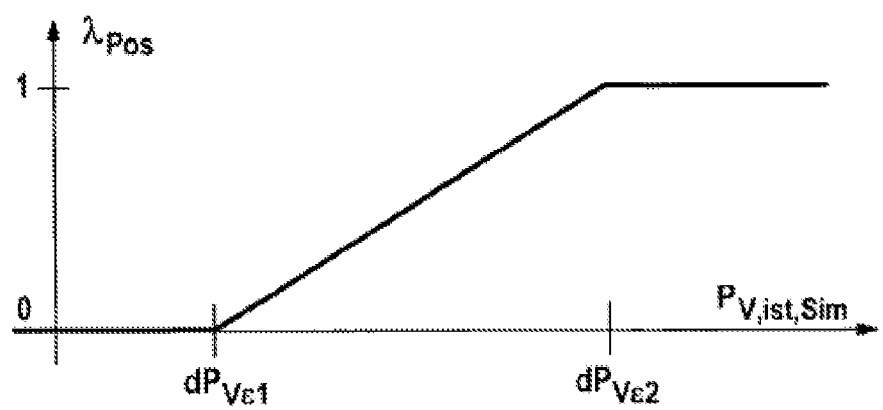
FIG. 11 shows an illustrative representation of a weighting function that can be used in the method according to the invention.

FIG. 11 shows an illustrative definition of a function f for determining the weighting factor $\lambda_{Pos}$ of the actuator position controller 460 using the pressure gradient $dP_{V,Ist,Sim}/dt$ determined:

$$\lambda_{Pos}=f(dP_{V,Ist,Sim}/dt).$$

In this specification and claims, variable subscripts are used from original text. The following variable subscripts may also be expressed and understood as: AKT —current value, Soll—nominal or target, Druck—pressure, ist—present.

While the above description constitutes the preferred embodiment of the present invention, it will be appreciated that the invention is susceptible to modification, variation and change without departing from the proper scope and fair meaning of the accompanying claims.

The invention claimed is:

1. A method for controlling an electrohydraulic braking system for motor vehicles, being activatable in a "brake-by-wire" operating mode comprising,
   providing an electronic control and regulation unit having a processor;
   providing a pressure supply device in communication with the processor of the electronic control and regulation unit, the pressure supply device condigured to be activated by the electronic control and regulation unit in a "brake-by-wire" system when in the "brake-by-wire" operating mode, the pressure supply device is connected or can be connected to at least one hydraulically actuatable wheel brake and by means of which the wheel brake can be hydraulically actuated,
   wherein the pressure supply device is formed by a cylinder-piston assembly, the piston of which can be actuated by an electromechanical actuator,
   determining by the processor a pressure target value ($P_{V,Soll}$) for the pressure supply device,
   performing by the processor a pressure control operation or an actuator position control operation on the pressure supply device in accordance with the magnitude of the pressure target value ($P_{V,Soll}$).

2. The method as claimed in claim 1, further comprising determining by the processor a target value for the rotational speed of an electric motor of the actuator, ($\omega_{Akt,Soll}$) both during the pressure control operation and during the actuator position control operation.

3. The method as claimed in claim 1 further comprising determining by the processor a driver's required pressure target value ($P_{V,Soll,Drv}$) using at least two independent signals from at least one sensor device.

4. The method as claimed in claim 3, further comprising specifying by the processor a target value selection and a pressure target valve ($P_{V,Soll}$) between the driver's required pressure target value ($P_{V,Soll,Drv}$) and another pressure target value ($P_{V,Soll,Esc}$) specified by a higher-ranking control system, and providing at least one of an antilock system, a traction control system, an adaptive cruise control system or a vehicle dynamics control system, and using the pressure target value ($P_{V,Soll}$) determined in the target value selection for deciding on the performance of the pressure control operation or the actuator position control operation.

5. The method as claimed in claim 4 further comprising performing by the processor the pressure control operation on the pressure supply device if the pressure target value ($P_{V,Soll}$) is greater than zero bar.

6. The method as claimed in claim 1 further comprising, during the pressure control operation, providing a pressure controller, which outputs a first pressure-controller speed target value ($\omega_{Akt,Soll,DR,Ctrl}$), which has superimposed thereon a speed feedforward function, which outputs a second pressure-controller speed target value ($\omega_{Akt,Soll,DR,FFW}$), wherein the first and second pressure-controller speed target values ($\omega_{Akt,Soll,DR,Ctrl}$, $\omega_{Akt,Soll,DR,FFW}$) are added.

7. The method as claimed in claim 6, further comprising in that a limited pressure-controller speed target value ($\omega_{Akt,Soll}$) is determined by the processor from the sum of the first and the second pressure-controller speed target values, taking into account predetermined minimum and maximum speed limiting values ($\omega_{Min}$, $\omega_{Max}$), and taking into account a predetermined speed limiting function, which specifies a relationship between a current actuator position ($X_{Akt}$) and the associated minimum and maximum speed limiting values ($\omega_{Min}$, $\omega_{Max}$).

8. The method as claimed in claim 4 further comprising performing by the processor during the pressure control operation, an actuator torque feedforward operation during which a motor torque ($M_{Akt,Pv}$) corresponding to the pressure target value ($P_{V,Soll}$) is determined, wherein the pressure ($P_{V,Ist}$) currently being supplied by the pressure supply device is additionally also taken into account, for the purpose of determining a motor torque ($M_{Akt,Pv}$) in the case of a speed limiting operation.

9. The method as claimed in claim 4 further comprising performing by the processor the actuator position control operation on the pressure supply device if the pressure target value ($P_{V,Soll}$) is less than or equal to a predetermined is equal to zero bar, and the pressure ($P_{V,Ist}$) currently being supplied by the pressure supply device is less than a predetermined minimum pressure threshold value ($P_{V,Ist,Min}$)

10. The method as claimed in claim 1 further comprising during the actuator position control operation, providing a position controller, which outputs a first position-controller speed target value ($\omega_{Akt,Soll,LR,Ctrl}$), and superimposing thereof a speed feedforward function, which outputs a second position-controller speed target value ($\omega_{Akt,Soll,LR,FFW}$), wherein the first and second position-controller speed target values ($\omega_{Akt,Soll,LR,Ctrl}$, $\omega_{Akt,Soll,LR,FFW}$) are added.

11. The method as claimed in claim 1 further comprising performing after the pressure or the actuator position control operation (400), an actuator speed control operation in which a current actuator speed ($W_{Akt}$) is adjusted to a target value for the actuator speed ($\omega_{Akt,Soll}$) output by the pressure or the actuator position control operation.

12. The method as claimed in claim 1 further comprising in that a pressure target value ($P_{V,Soll}$, $P_{V,Soll,Drv}$) is determined by the processor, wherein, in determining the pressure target value ($P_{V,Soll}$, $P_{V,Soll,Drv}$), an actuating speed ($V_{Ped}$) of a brake pedal is taken into account.

13. The method as claimed in claim 12, further comprising in that a driver's required pressure target value ($P_{V,Soll,Drv}$), is formed from the sum of a first target pressure component ($P_{V,Soll,Drv,Stat}$) and a second target pressure component ($P_{V,Soll,Drv,Dyn}$).

14. The method as claimed in claim 13, further comprising in that the first target pressure component ($P_{V,Soll,Drv,Stat}$) is determined by the processor using a predetermined functional relationship ($f(X_{Ped})$, $f(X_{Ped}, P_{Drv}, V_{Kfz})$) from at least one signal related to the pedal actuation, in the form of a pedal position or travel ($X_{Ped}$) signal or a pressure information ($P_{Drv}$) signal.

15. The method as claimed in claim 13 further comprising in that the second target pressure component ($P_{V,Soll,Drv,Dyn}$) is determined by the processor in accordance with the brake pedal actuation speed ($V_{Ped}$) and a pedal speed threshold ($V_{Ped,Limit}$).

16. The method as claimed in claim 1 further comprising in that an expected pressure gradient, is determined by the processor, and that the pressure control operation or the actuator position control operation or a combined pressure and actuator position control operation is performed on the pressure supply device in accordance with the magnitude of a pressure target value ($P_{V,Soll}$) or the magnitude of a pressure gradient ($dP_{V,Ist,Sim}$dt).

17. The method as claimed in claim 16, further comprising in that the pressure target value ($P_{V,Soll}$) is used in an actuator position controller to determine a first component target value for the actuator rotational speed ($\omega_{Akt,Soll,LR}$) and is used in a pressure controller to determine a second component target value for the actuator speed ($\omega_{Akt,Soll,DR}$), and in that a target value for the actuator speed ($\omega_{Akt,Soll}$) in the speed control operation on the pressure supply device is determined from the first and second component target values.

18. The method as claimed in claim 17, further comprising in that the target value for the actuator speed ($\omega_{Akt,Soll}$) is determined by the processor from the first and second component target values by weighted addition, wherein the respective weighting factor ($\lambda_{Pos}$, $\lambda_{Druck}$) is determined in accordance with the expected pressure gradient ($dP_{V,Ist,Sim}$/dt).

19. The method as claimed in claim 16 further comprising in that the pressure gradient ($dP_{V,Ist,Sim}$/dt) is determined by the processor using the pressure target value ($P_{V,Soll}$) and a predetermined model of the control behavior of the pressure supply device.

20. A system for controlling an electrohydraulic braking system for motor vehicles, being activatable in a "brake-by-wire" operating mode, the system comprising:
   an electronic control and regulation unit having a processor;
   a pressure supply device in communication with the processor of the electronic control and regulation unit, the pressure supply device configured to be activated by the electronic control and regulation unit in a "brake-by-wire" system when in the "brake-by-wire" operating mode, the pressure supply device is connected or can be connected to at least one hydraulically actuatable wheel brake and by means of which the wheel brake can be hydraulically actuated, the pressure supply device is formed by a cylinder-piston assembly, the piston of which can be actuated by an electromechanical actuator, wherein the processor is configured to determine a pressure target value ($P_{V,Soll}$) for the pressure supply device wherein the processor is configured to perform a pressure control operation or an actuator position control operation on the pressure supply device in accordance with the magnitude of the pressure target value ($P_{V,Soll}$).

\* \* \* \* \*